United States Patent
Center et al.

(10) Patent No.: US 9,033,099 B2
(45) Date of Patent: May 19, 2015

(54) PROTECTIVE ENCLOSURE FOR ENHANCING SOUND FROM AN ELECTRONIC DEVICE

(71) Applicant: OTTER PRODUCTS, LLC, Fort Collins, CO (US)

(72) Inventors: Adam D. Center, Fort Collins, CO (US); Jonathan B. Rayeski, Fort Collins, CO (US); Nicholas J. Boyarski, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 0 days.

(21) Appl. No.: 14/134,129

(22) Filed: Dec. 19, 2013

(65) Prior Publication Data

US 2014/0166390 A1 Jun. 19, 2014

Related U.S. Application Data

(60) Provisional application No. 61/739,433, filed on Dec. 19, 2012.

(51) Int. Cl.
*H04R 1/02* (2006.01)
*G10K 11/32* (2006.01)
*H04R 1/30* (2006.01)

(52) U.S. Cl.
CPC ............... *H04R 1/025* (2013.01); *H04R 1/02* (2013.01); *H04R 1/30* (2013.01); *H04R 2499/11* (2013.01); *G10K 11/32* (2013.01)

(58) Field of Classification Search
CPC ....... H04M 1/6041; H04R 1/34; H04R 1/345; H04R 1/20; H04R 1/323; H04R 1/2896; H04R 1/2853; A45C 2011/002
USPC .......... 181/177, 179, 191, 192, 199; 381/338, 381/339, 340, 341; D14/188, 250
See application file for complete search history.

(56) References Cited

U.S. PATENT DOCUMENTS

| | | | |
|---|---|---|---|
| 5,360,108 A | | 11/1994 | Alagia |
| 5,703,946 A | * | 12/1997 | Chen ............................ 379/446 |
| 5,890,072 A | * | 3/1999 | Rabe ......................... 455/550.1 |
| 6,317,313 B1 | | 11/2001 | Mosgrove et al. |
| 6,349,824 B1 | | 2/2002 | Yamada |
| D516,807 S | | 3/2006 | Richardson et al. |
| 7,158,376 B2 | | 1/2007 | Richardson et al. |
| 7,180,735 B2 | | 2/2007 | Thomas et al. |
| 7,194,291 B2 | | 3/2007 | Peng |
| 7,341,144 B2 | | 3/2008 | Tajiri et al. |
| 7,343,184 B2 | | 3/2008 | Rostami |
| D575,056 S | | 8/2008 | Tan |
| D581,421 S | | 11/2008 | Richardson et al. |

(Continued)

FOREIGN PATENT DOCUMENTS

TW M394026 U1 * 12/2010

*Primary Examiner* — Jeremy Luks

(57) ABSTRACT

A protective enclosure for an electronic device can include a waveguide to direct and enhance sound waves emanating from a speaker of an electronic device when installed in the protective enclosure. The waveguide can include a first end and a second end. The first end of the waveguide can be located proximate the speaker of the electronic device. The waveguide can increase in cross-sectional area between the first end and the second end. The second end of the waveguide can be located proximate a front surface of the protective enclosure and can direct sound waves toward a user of the electronic device.

20 Claims, 8 Drawing Sheets

(56) References Cited

U.S. PATENT DOCUMENTS

| | | |
|---|---|---|
| D582,149 S | 12/2008 | Tan |
| D589,016 S | 3/2009 | Richardson et al. |
| D593,319 S | 6/2009 | Richardson et al. |
| 2002/0009195 A1* | 1/2002 | Schon .......................... 379/454 |
| 2010/0203931 A1* | 8/2010 | Hynecek et al. ........... 455/575.8 |
| 2011/0019854 A1* | 1/2011 | Graber .......................... 381/341 |
| 2011/0226545 A1* | 9/2011 | Richardson et al. .......... 181/200 |
| 2012/0027237 A1* | 2/2012 | Lin ............................... 381/340 |
| 2012/0294469 A1* | 11/2012 | Weaver, III ................... 381/334 |

* cited by examiner

PROTECTIVE ENCLOSURE FOR ENHANCING SOUND FROM AN ELECTRONIC DEVICE

CROSS-REFERENCE TO RELATED APPLICATIONS

This application is a non-provisional of U.S. patent application 61/739,433, filed Dec. 19, 2012, which is hereby incorporated by reference in its entirety.

BACKGROUND

Many electronic devices are designed for communication or entertainment purposes. These devices include, for example, computers, tablets, digital cameras, audio players, video players, smartphones, two-way radios, e-readers, and GPS receivers. These devices often contain sensitive or fragile components, such as electronic components or glass, which can be easily damaged when the device is dropped or exposed to substantial forces. To protect the device from damage, the device can be installed in a protective enclosure. But certain enclosures can diminish the performance of the device, such as the performance of certain built-in speakers.

BRIEF DESCRIPTIONS OF DRAWINGS

DETAILED DESCRIPTION

Figure 1:
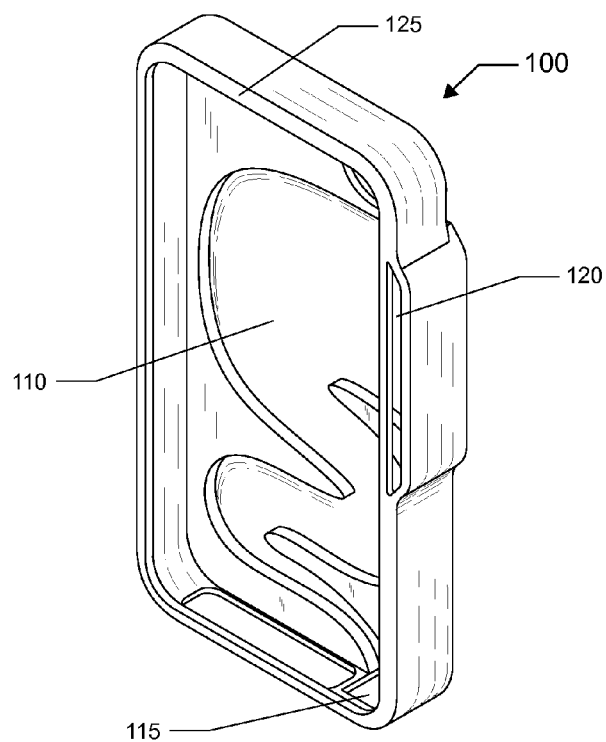
FIG. 1 is a front right perspective view of a protective enclosure for an electronic device.

A loudspeaker, more commonly referred to as a "speaker," can be an electroacoustic transducer that produces sound in response to an electrical audio signal input. Many electronic devices, such as computers, tablets, audio players, video players, smart phones, digital cameras, two-way radios, and GPS receivers, include one or more miniature speakers that allow the device to produce sound. These speakers can be used, for example, to produce a ringtone to announce an incoming call or text message or to play music from an audio file or music accompanying a video file playing on a screen of the electronic device. Often, these speakers are small due to physical constraints of the device, such as a smartphone, digital audio player, or tablet being relatively thin and lightweight. Miniature speakers often lack volume and often have a limited frequency response, which a user perceives primarily as a lack of bass response. As a result, the user's listening experience is diminished when she must rely solely on the device's miniature speaker.

Many solutions for improving the user's listening experience are available on the market, but each of these solutions has limitations. For instance, there are many varieties of external speakers that are designed to be used with electronic devices. These include docking stations configured to receive and cradle the electronic device while providing an electrical connection to transmit audio signals from the electronic device to the docking station, either wirelessly (e.g. via Bluetooth or WiFi) or through a wired connection. Docking stations are popular stationary solutions in home or office settings. But external speakers tend to be relatively large and heavy, so they are not a viable mobile solution. Also, many docking stations rely on an electrical outlet or Universal Serial Bus (USB) port for power, which further reduces mobility.

For consumers seeking a mobile solution, headphones are a popular choice. But headphones also have limitations. For instance, when showing a friend a video on the device's screen, the user is forced to choose between sharing the headphones with the friend or disconnecting the headphones from the device and relying on the device's built-in miniature speaker. If the headphones are shared, and the audio is recorded in stereo (e.g. with independent left and right audio channels), each listener will miss out on a portion of the sound. Alternately, if the headphones are disconnected, both listeners are forced to listen to poor sound quality delivered by the device's miniature speaker. This can be a problem in certain situations. For example, if a user wants to show a video to a friend while meeting in a crowded environment where ambient noise levels are high, such as a restaurant or sporting event, the ambient noise can easily overpower the miniature speaker. In these situations, there is no way for both users to enjoy the full audio that accompanies the video.

To overcome at least the problems discussed above, a protective enclosure 100 for an electronic device 105 can include a waveguide 110, as shown in FIGS. 1, 2 and 7-12. Sound from a speaker 405 in the electronic device 105 can be introduced into a first end 115 of the waveguide. The sound produced by the speaker 405 can be a pressure gradient that propagates through the waveguide 110 at the speed of sound to a second end 120 of the waveguide. As a result of its shape, the waveguide 110 can increase loudness perceived by a user without requiring more wattage to the speaker 405. Consequently, the waveguide 110 can increase loudness perceived by a user without increasing power demands from the device's battery.

Figure 4:
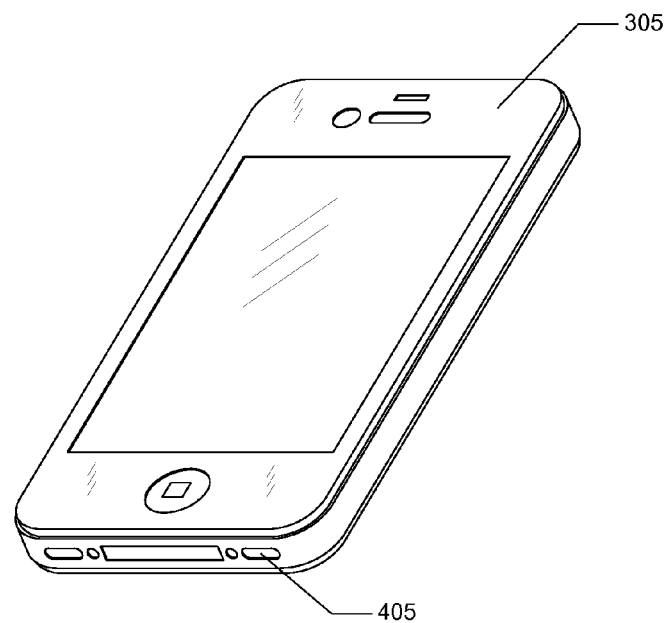
FIG. 4 is a front view of an electronic device.

In one example, the waveguide 110 can increase the loudness perceived by the user by improving the directivity of the miniature speaker 405. For instance, the waveguide 110 can focus the sound in the direction of a user's ears. In certain electronic devices, such as Apple iPhone® models and Samsung Galaxy® models, the speaker 405 is located proximate a bottom side surface of the electronic device 305, as shown in FIG. 4. In these devices, sound emanates from a bottom side surface of the device 305. Without a waveguide 110, the sound waves generated by the speaker 405 immediately enter free space and propagate in all directions. A sound wave loses power proportional to the square of the distance from the speaker 305, so at a distance (R) from the speaker, the power of the sound wave is equal to source power (P) divided by a square of the distance (i.e. power=$P/R^2$). In contrast, a properly designed waveguide 110 can confine the sound waves to propagate in substantially one dimension, as opposed to in three dimensions, thereby conserving wave power. As a result, sound waves that exits a second end 120 of the waveguide 110, which is directed at the user as shown in FIG. 1, and then travels a distance (R) to the user's ear, will have a greater wave power when it reaches the user's ear than a similar sound wave that emanates from a bottom side surface of the electronic device 305 into free space.

Figure 5:
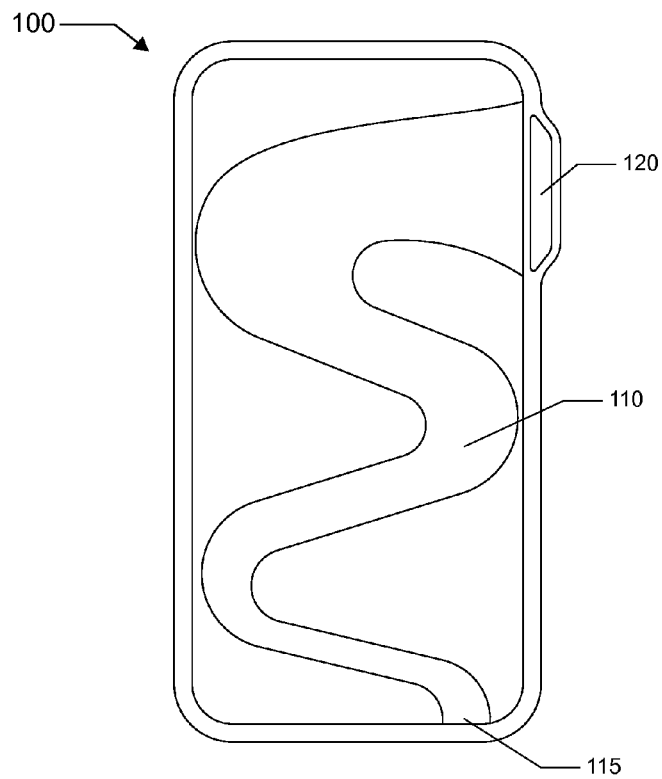
FIG. 5 is a front view of a protective enclosure for an electronic device.
Figure 7:
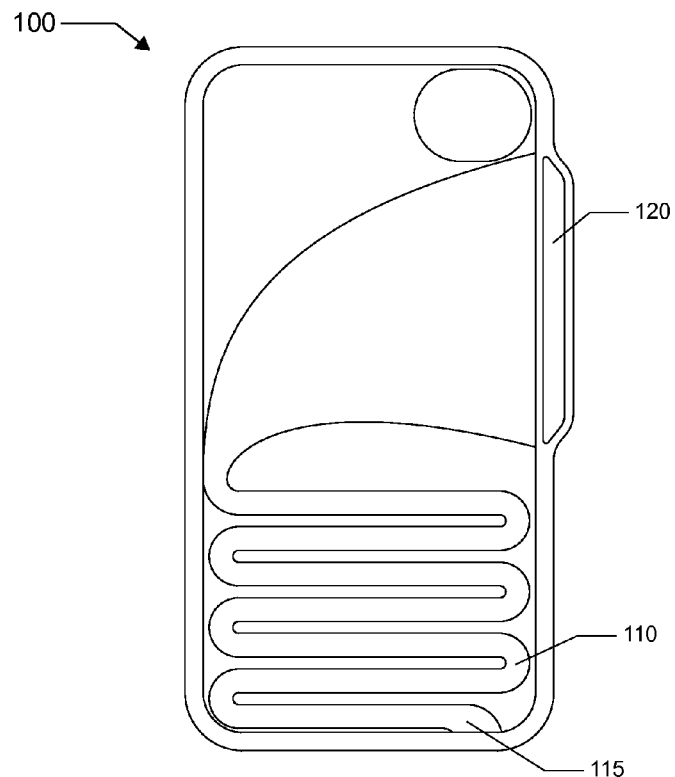
FIG. 7 is a front view of a protective enclosure for an electronic device.
Figure 8:
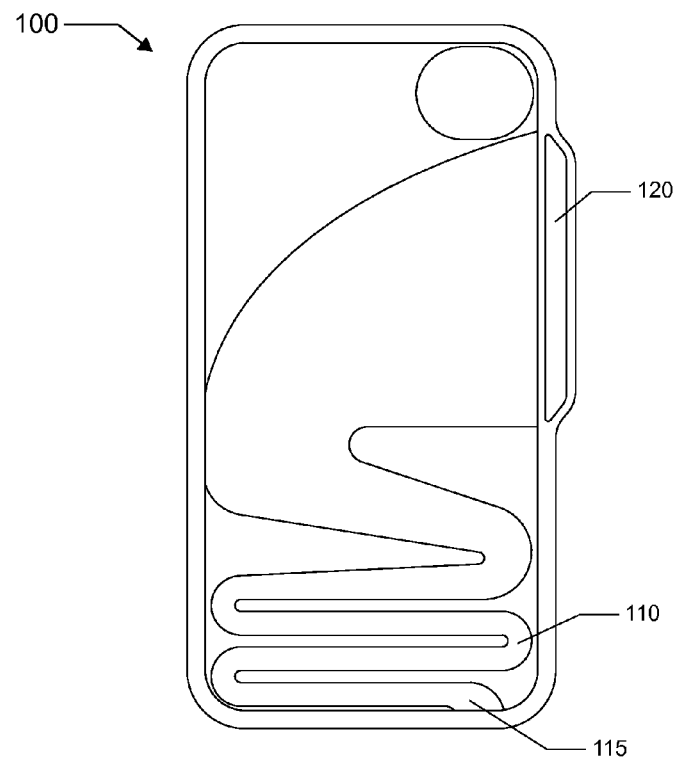
FIG. 8 is a front view of a protective enclosure for an electronic device.
Figure 9:
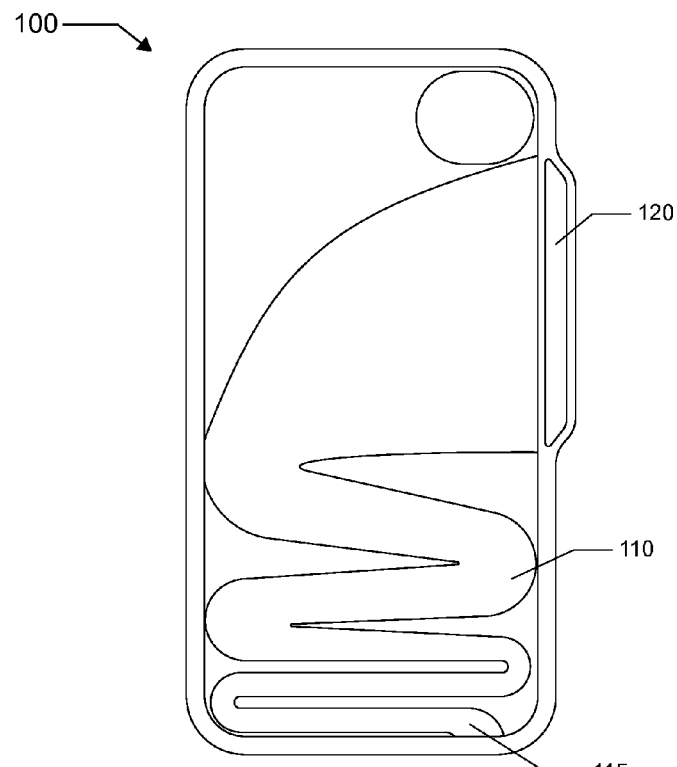
FIG. 9 is a front view of a protective enclosure for an electronic device.
Figure 10:
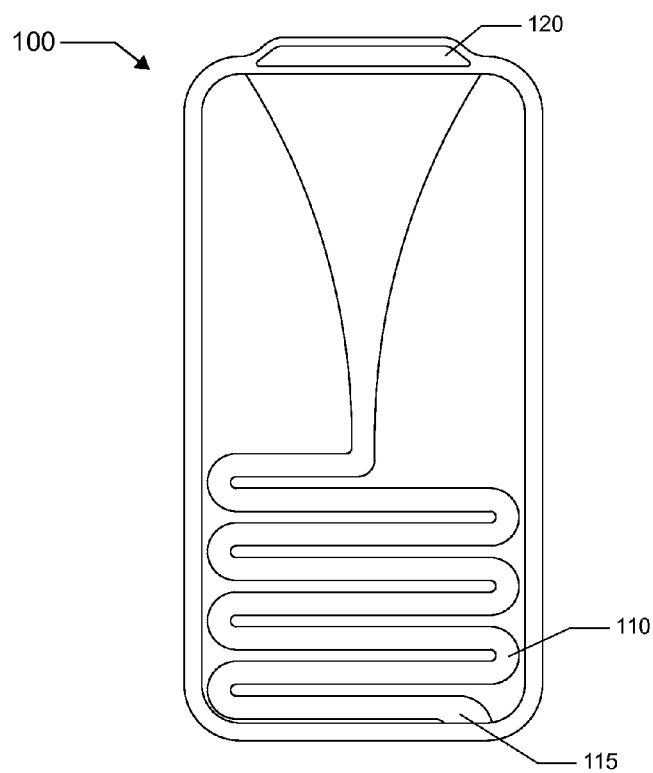
FIG. 10 is a front view of a protective enclosure for an electronic device.

The waveguide 110 can increase in cross-sectional area from the first opening 115 to the second opening 120. In one example, the increase in cross-sectional area can occur gradually along the length of the waveguide as shown in FIGS. 1 and 5, or along one or more certain portions of the waveguide as shown in FIGS. 7 and 10. The cross-sectional area of the waveguide 110 may increase along a portion of the waveguide proximate to its second end 120 as shown in FIG. 9.

The waveguide 105 can improve the coupling efficiency between the speaker 405 and the air surrounding the protective enclosure 100. For instance, the waveguide can improve acoustic impedance matching between the speaker, which has a high relative density, and the surrounding air, which has a low relative density. For example, the shaped waveguide 110 can act like a horn and can transform a small diameter, high pressure condition at a surface of the miniature speaker's 405 driver near the first opening 115 of the waveguide to a large diameter, low pressure condition at the second opening 120 of the waveguide, which better matches ambient pressure conditions of the air surrounding the protective enclosure 100. As a result, the sensitivity of the speaker can be increased, and the sound waves can be focused over a narrower area proximate the user. The size of the first and second openings (115, 120), the length (L) of the waveguide 110, and the total expansion along the length of the waveguide can be selected to allow the speaker 405 to perform better over a wider range of frequencies.

Figure 6:
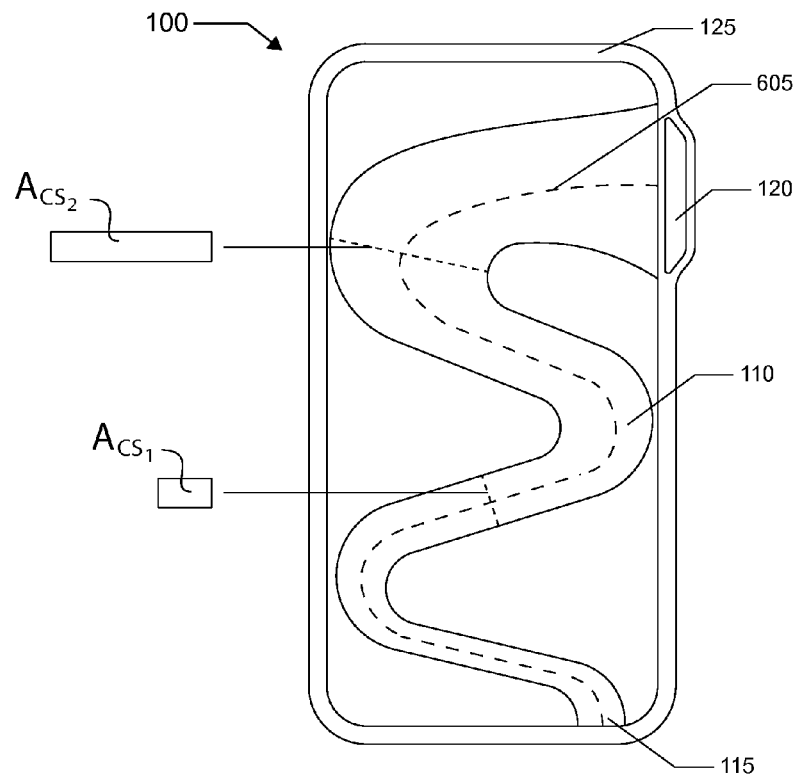
FIG. 6 is a front view of a protective enclosure for an electronic device showing a first and second cross-sectional area along a waveguide.

FIG. 6 shows a first cross-sectional area ($A_{cs1}$) and a second cross-sectional area ($A_{cs2}$) within the waveguide 110. The cross-sectional areas (e.g. $A_{cs1}$, $A_{cs2}$) can be measured in a plane that is normal to a centerline 605 of the waveguide 110. The length (L) of the waveguide 110 is equal to the length of the centerline 605 of the waveguide 110. The total expansion of the waveguide 110 can be determined by dividing the cross-sectional area at the second end 120 of the waveguide 110 by the cross-sectional area at the first end 115 of the waveguide (e.g. $A_{cs\_second\ end}/A_{cs2\_first\ end}$). Consequently, the "total expansion" can be expressed as a dimensionless number. For example, the total expansion of the waveguide 110 can be about 1.5 to 100, 2 to 50, or 2 to 25, 2 to 10, or 2 to 5. For an electronic device 100 such as a smartphone, the cross-sectional area of the first end can be less than about 1.0 cm$^2$, and the cross-sectional area of the second end can be greater than about 1.0 cm$^2$. In another example, the cross-sectional area of the first end can be less than about 1.0 cm$^2$, and the cross-sectional area of the second end can be greater than about 1.5 cm$^2$, 2.0 cm$^2$, 3.0 cm$^2$, or 4.0 cm$^2$.

Figure 16:
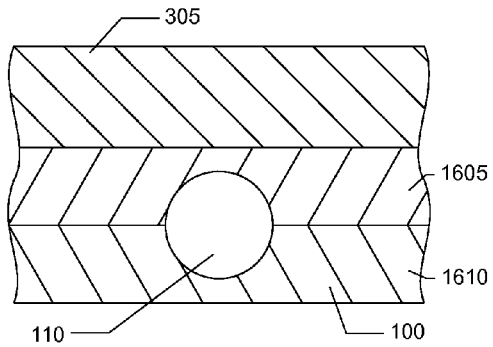
FIG. 16 is a cross-sectional view of a waveguide in a protective enclosure for an electronic device.
Figure 18:
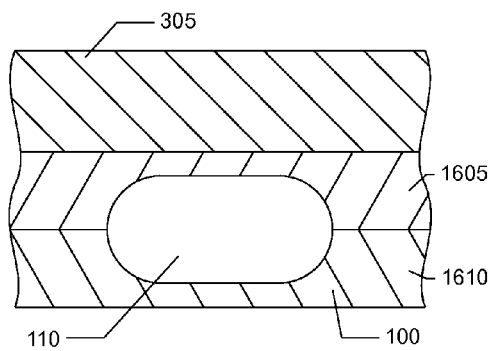
FIG. 18 is a cross-sectional view of a waveguide in a protective enclosure for an electronic device.
Figure 19:
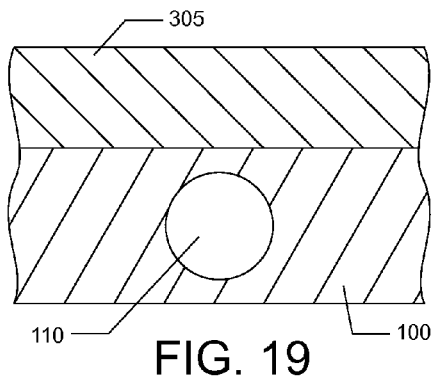
FIG. 19 is a cross-sectional view of a waveguide in a protective enclosure for an electronic device.
Figure 20:
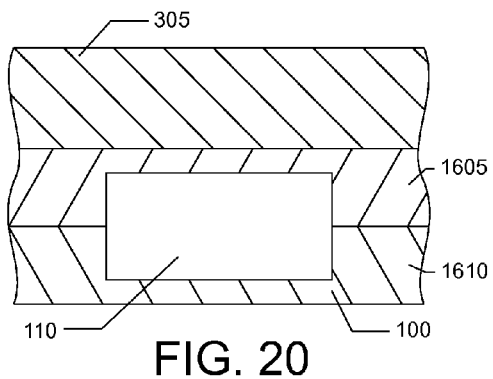
FIG. 20 is a cross-sectional view of a waveguide in a protective enclosure for an electronic device.

In one example, the waveguide 110 can be disposed within the protective enclosure 100. In this example, the waveguide 110 can be a passage through the protective enclosure 100 and can be bounded along its length by the protective enclosure alone, as shown in FIGS. 14, 16, 18, 19, and 20. The waveguide can be formed within the protective enclosure, as shown in FIG. 19. Alternately, to simplify manufacturing, the protective enclosure may include two pieces that when connected form the waveguide. For example, the protective enclosure can include an upper portion 1605 and a lower portion 1610 that can be connected to form a waveguide 110, as shown in FIGS. 16, 18, and 20.

Figure 2:
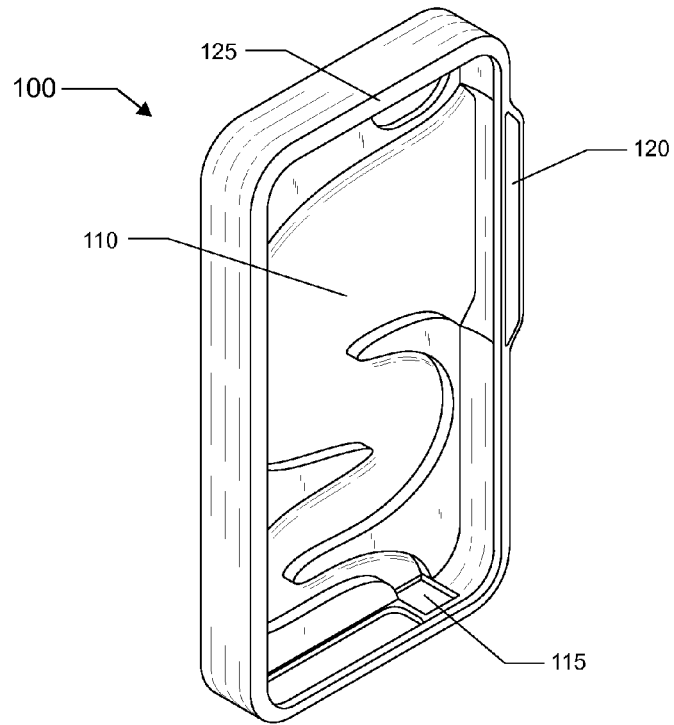
FIG. 2 is a front left perspective view of a protective enclosure for an electronic device.
Figure 3:
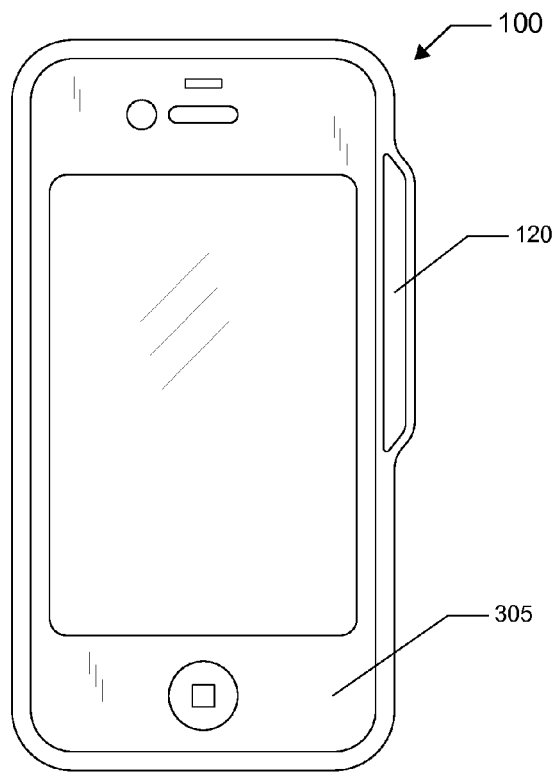
FIG. 3 is a front view of an electronic device in a protective enclosure.

In another example, shown in FIGS. 1, 13, 15, and 17, an electronic device 305 installed in the enclosure 100 can form one bounding surface of the waveguide 110 along the length (L) of the waveguide. For example, a back side surface 1305 of the electronic device can bound the waveguide 110. In certain instances, the back side surface 1305 of the electronic device 305 can seal the waveguide 110 along its length (L), making the waveguide substantially airtight with the exception of the second end 120, which remains open. As a result, when an electronic device 305 is not installed in the enclosure, the waveguide may appear as a trough extending from the first opening 115 to the second opening 120, as shown in FIGS. 1 and 2. Utilizing the back side surface 1305 of the electronic device 305 to bound the waveguide 110 can allow the protective enclosure to be thinner between its front surface 125 and back surface 1310, which is an attribute certain users may prefer.

In the example where the waveguide 110 is a trough that relies on a surface of the electronic device 305 to bound the waveguide along its length, the protective enclosure 100 can include a feature to improve sealing of the waveguide at the interface between the protective enclosure and the device. For example, the protective enclosure can include any suitable sealing material 1325, such as silicon rubber, positioned proximate a left rim 1315 and a right rim 1320 of the trough. The sealing material 1325 can be of a proper thickness, so that when the electronic device 305 is installed in the enclosure 100, the sealing material becomes slightly compressed thereby providing sealing forces against the enclosure and the device. In one example, the waveguide 110 can be airtight along its length. Having an airtight waveguide 110 can improve the efficiency of sound transmission through the waveguide. The sealing material 1325 can also provide damping between the enclosure 100 and electronic device 305 to reduce or eliminate buzzing or other unwanted noise or vibrations resulting from the transmission of sound waves through the waveguide 110.

The Apple's iPhone® 4S contains a speaker 405, which performs comparably to those in other handheld electronic devices. This speaker was tested using a software application that was downloaded to the device and was capable of generating frequencies between 20 Hz and 20 kHz. The test goal was to evaluate the capability of the speaker. On the low end of the frequency range, the speaker's performance was found to drop off considerably below about 300 Hz and was inaudible to human test subjects below about 125 Hz. On the high end of the frequency range, the speaker's performance was found to drop off considerably above about 13.5 kHz and was inaudible to human test subjects above 14.5 kHz.

The sensitivity of the human ear varies with frequency, and sensitivity falls off rapidly near the upper and lower ends of the audible frequency range. Children are capable of hearing frequencies from about 20 Hz to about 20 kHz. As people age, the sensitivity of their hearing decreases, primarily for higher frequencies. For instance, a person that is 65 years of age may hear frequencies only up to about 9 kHz. The human ear is most sensitive around 3.5 kHz. Consequently, it can be desirable to create a waveguide 110 that effectively produces frequencies near 3.5 kHz to enhance the user's listening experience by enhancing sounds waves at or near the frequency where the user's hearing is most effective.

In one example, the electronic device's speaker 405 can be activated when the phone enters a speaker phone mode. In this mode, the speaker is commonly tasked with producing human voices. The speech of a typical adult male has a fundamental frequency of about 85 to 180 Hz, and the speech of a typical adult female has a fundamental frequency of about 165 to 255 Hz. When comparing these fundamental frequency ranges to the capabilities of the iPhone 4S's speaker 405, it is apparent that the fundamental frequency ranges fall outside of the speaker's capability. This is common in most phones and is overcome by the speaker's ability to produce higher harmonics of the fundamental frequency, which humans rely on to decipher speech. By producing enough higher harmonics of the fundamental frequency, the speaker provides a listener with an impression of hearing the fundamental frequency, even though the fundamental frequency is absent. This approach is common in the telephone industry, which makes use of a frequency band from about 300 to 3400 Hz, which excludes the fundamental frequency ranges of both males and females.

Lower harmonics of human voices appear in the frequency band between 300 and 600 Hz, and additional harmonics appear between 600 Hz and 1.2 kHz. The band for deciphering dialog between humans is between 1.2 and 2.4 kHz. In this band, there are sufficient harmonics to allow the human ear to decipher vowels and consonants in words, so it is desirable that the speaker 405 in the device 305 can effectively produce sounds in this frequency range. As shown by testing, the speaker in the Apple iPhone 4S can effectively produce frequencies in the range of about 300 to 2.4 kHz. For the protective enclosure 100 to improve the speaker's performance while in speakerphone mode, it is desirable for the waveguide to improve the device's production of frequencies in the range of, for example, about 300 to 2.4 kHz.

To accurately produce a sound wave at a certain frequency, the waveguide 110 must be at least as long as one wavelength of the frequency being produced to allow the sound wave to fully form within the waveguide. Since a low frequency wave, such as a bass tone, will have a longer wavelength than a high frequency wave, such as a treble tone, the waveguide's length (L) will dictate the lowest frequency that can be produced from the waveguide. Frequencies that are longer than the waveguide may be filtered out, causing the waveguide to act as a high-pass filter. Consequently, to extend the low frequency range of the waveguide 110, it can be desirable to increase the length (L) of the waveguide.

The relationship between wavelength and frequency is described by the equation $\lambda = c/f$, where $\lambda$ is wavelength, c is the speed of sound in air at standard temperature and pressure, and f is the frequency of the wave. In view of this equation, an acoustic wave with a frequency of 3.5 kHZ, which is a frequency that corresponds to the human ear's highest sensitivity, has a wavelength of about 9.8 cm. Therefore, to accurately produce this frequency, the waveguide 110 should have a length of at least 9.8 cm.

To extend the low frequency capability of the waveguide 110, it can be desirable to increase the length (L) of the waveguide 110. As discussed above, important harmonics of the human voice appear in the range between 1.2 and 2.4 kHz. A frequency of 1.2 kHz corresponds to a wavelength 110 of about 28.6 cm, and a frequency of about 2.4 kHz corresponds to a wavelength of about 14.3 cm. Therefore, in one example, the waveguide 110 can have a length of at least 14.3 cm to allow the waveguide to produce frequencies down to about 2.4 kHz, and in another example the waveguide can have a length of at least 28.6 cm to allow the waveguide to produce frequencies down to about 1.2 kHz.

As noted above, lower fundamental frequencies of the human voice appear between 600 Hz and 1.2 kHz, so in another example, the waveguide 110 can have a length of at least 57.2 cm to produce frequencies down to about 600 Hz. As also noted above, even lower fundamental frequencies of the human voice appear between 300 Hz and 600 Hz, so in another example, the waveguide can have a length of at least 114.5 cm to produce frequencies down to about 300 Hz. In yet another example, the waveguide 110 can have a length of at least 274.7 cm to produce frequencies down to about 125 Hz, which was determined to be the lowest frequency the iPhone's speaker was capable of generating at an audible volume. In other examples, the waveguide 110 can have a length of about 4-275 cm, 4-114 cm, 4-57 cm, 4-28 cm, 4-14 cm, 10-275 cm, 10-114 cm, 10-57 cm, 10-28 cm, 10-14 cm, 14-275 cm, 14-114 cm, 14-57 cm, 14-28 cm, 28-275 cm, 28-114 cm, 28-57 cm, 57-275 cm, 57-114 cm, or 114-275 cm.

Figure 11:
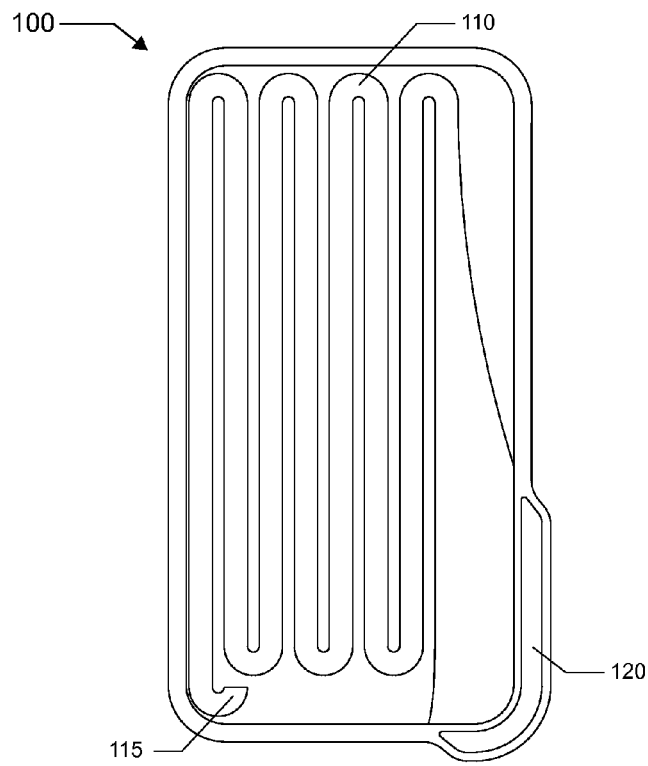
FIG. 11 is a front view of a protective enclosure for an electronic device.
Figure 12:
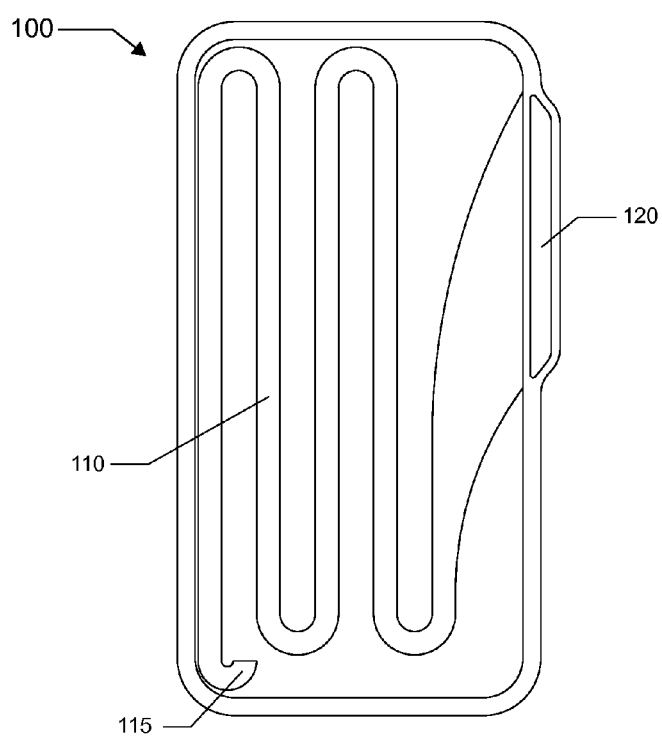
FIG. 12 is a front view of a protective enclosure for an electronic device.
Figure 13:
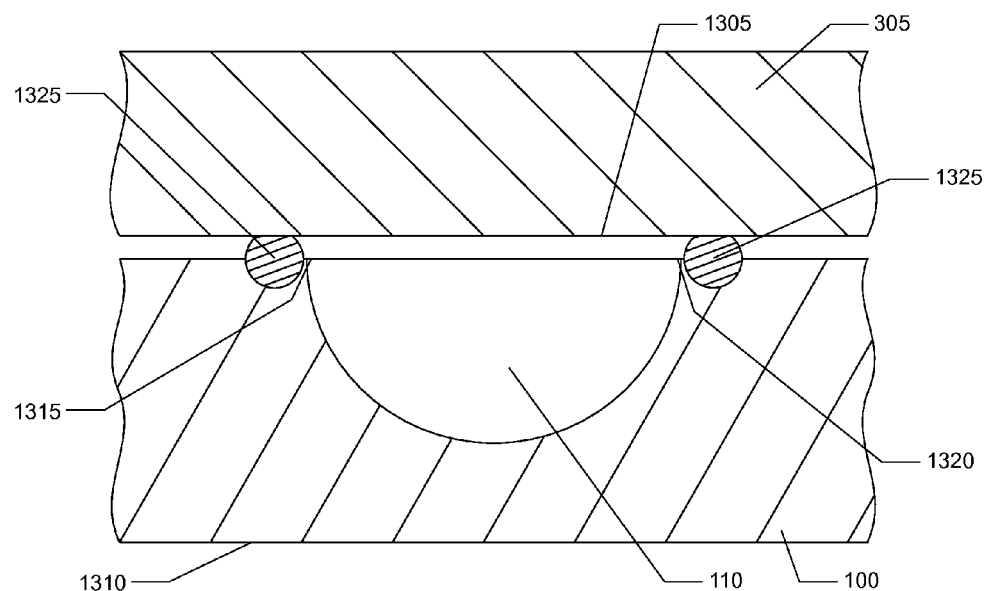
FIG. 13 is a cross-sectional view of a waveguide in a protective enclosure for an electronic device.
Figure 14:
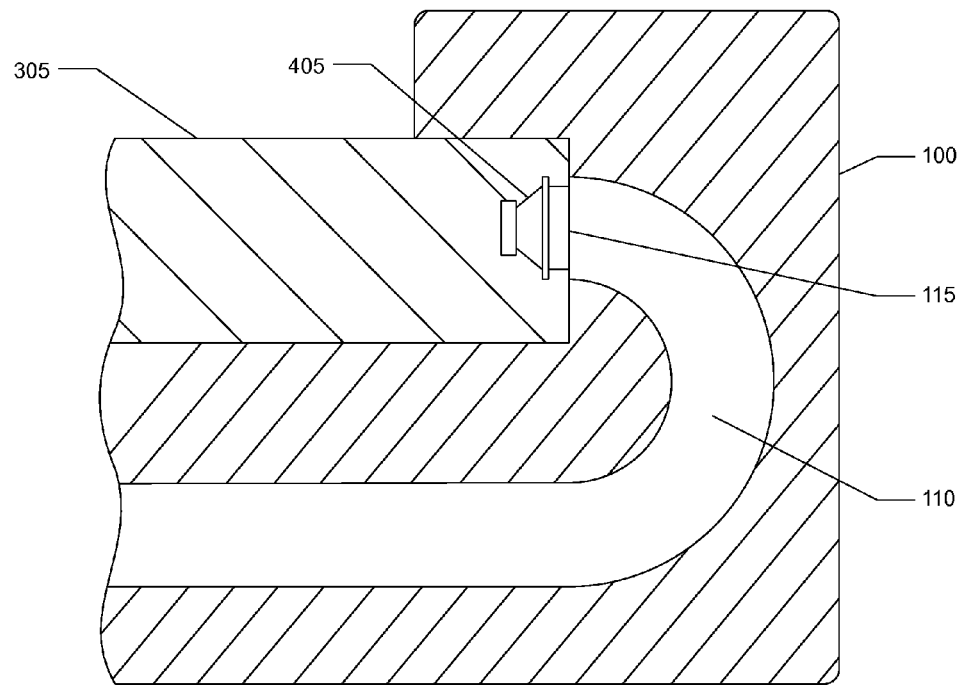
FIG. 14 is a cross-sectional view of a waveguide in a protective enclosure for an electronic device.
Figure 15:
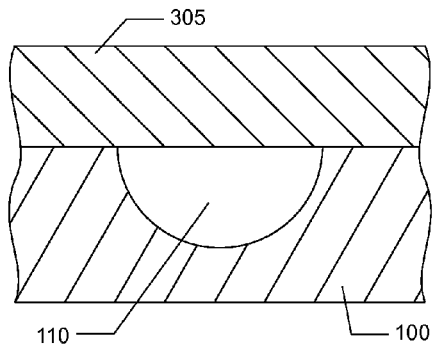
FIG. 15 is a cross-sectional view of a waveguide in a protective enclosure for an electronic device.

The length (L) of the waveguide can be constrained by the size of the protective enclosure 100. For example, a first protective enclosure 100 for a small mobile phone will provide less space for including a waveguide 110 than a second protective enclosure for a large tablet computer or laptop computer. However, in both protective enclosures 100, a folded waveguide 110 can be used to maximize the length of the waveguide. As shown in FIGS. 5 and 7-12, a folded waveguide 110 can wrap within the protective enclosure 100 multiple times to increase the length (L) of the waveguide without increasing the height or width of the protective enclosure 100. The folded waveguide 110 can wrap back and forth any suitable number of times. The second end 120 of the waveguide can exit at any location proximate the perimeter of the protective enclosure 100 as shown in FIGS. 1, 10 and 11, and can be directed at the user.

The waveguide can have a round, oval, or rectangular cross-sectional shape, as shown in FIGS. 16, 18, and 20, respectively. Alternately, the waveguide 110 can have any other suitable cross-sectional shape, or the shape may vary along the length of the waveguide. For example the cross-sectional shape of the waveguide may be oval at the first end and a rectangular at the second end of waveguide. Therefore, the expansion within the waveguide 110 between the first and second ends of the waveguide can have any suitable shape. For example, the expansion can be a three-dimensional expansion, such as a conical expansion, exponential expansion, hyperbolic expansion, tractrix expansion, quadratic expansion, or any other suitable three-dimensional expansion. In another example, the expansion can be primarily a two-dimensional expansion having any suitable shape. A two-dimensional expansion, where expansion occurs primarily in width of the waveguide 110 along the length (L) of the waveguide while height of the waveguide remains relatively constant, can allow the protective enclosure to be thinner between the front surface 125 and the back surface 1310 of the enclosure, which is an attribute certain users may prefer.

The waveguide 110 can include acoustic foam. Acoustic foam can be disposed within the waveguide 110 to filter certain frequencies emanating from the speaker 405 which may be perceived as harsh by the user. For example, acoustic foam can be used to filter (e.g. by absorption or other forms of energy dissipation) higher frequencies to provide a more balanced overall sound from the waveguide 110. Filtering higher frequencies may include filtering them entirely or simply reducing their amplitude.

Figure 17:
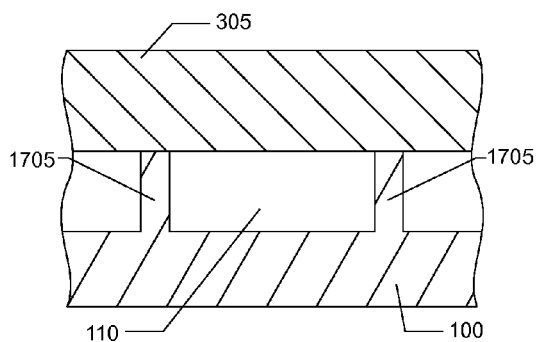
FIG. 17 is a cross-sectional view of a waveguide in a protective enclosure for an electronic device.

In one example shown in FIG. 17, ribs 1705 can form the sides of the waveguide 110 within the protective enclosure 100. The inclusion of the ribs 1705 as part of the waveguide 100 can increase the rigidity of the protective enclosure 100. In the case of a folded waveguide 110 that traverses the length or width of the protective enclosure 100 numerous times, employing ribs can significantly increase the rigidity of the enclosure, which can increase the level of protection provided to the electronic device 305.

The first end 115 of the waveguide can be designed to receive sound from the speaker 405 of the electronic device 305. As shown in FIG. 2, the first end 115 of the waveguide 110 can be positioned proximate the speaker 405 to allow the first end to receive sound from the speaker. In one example shown in FIG. 14, the first end 115 can form a seal around the speaker 405 and against an outer surface of the electronic device 305 to ensure that sound produced by the speaker is received by the first end and is guided directly into the waveguide 110. The first end 115 of the waveguide 110 can be formed in the protective enclosure 100 by, for example, a molding process. In one example, the first end 115 can include a first seal that is positioned between the first end 115 and a surface of the electronic device. The first seal can be made of any suitable sealing material, such as silicone rubber, and can improve sealing between the first end 115 of the waveguide 110 and the electronic device 305. For example, the sealing material may compress when the electronic device 105 is installed in the protective enclosure 100, thereby providing sealing forces against the device 105 and the first end 115 of the waveguide 110. In one example, the seal formed between the first end 115 and the device 105 can be airtight to improve the performance of the waveguide.

The waveguide 110 can allow sound waves to travel from the first end 115 to the second end 120 of the waveguide. The waveguide 110 can be made of any suitable material, such as polycarbonate, nylon, acrylonitrile butadiene styrene (ABS), or fiberglass reinforced nylon. In one example, a relatively hard material can be selected to increase the transmission efficiency of the waveguide 110. In another example, a relatively soft material, such as silicone rubber, foam, or felt, can be selected to increase the absorption of certain frequencies and to dampen vibrations between the enclosure 100 and the electronic device 305. For instance, the inner surface of the protective enclosure can include a layer made of a relatively soft material, such as silicone rubber, foam, or felt. In particular, the inner surface of the protective enclosure can include a silicone layer. In another example, the waveguide 110 can be made of a relatively hard material to increase the transmission efficiency of the waveguide, and other portions of the protective enclosure 100, such as an inner surface of the protective enclosure, can be made of a relatively soft material to dampen unwanted vibrations and to cushion the electronic device.

A parabolic reflector can be used to redirect sound waves in a coherent manner. For instance, a point source (e.g. such as a speaker) can generate a spherical wave. If the speaker is placed at the focus (F) of a parabolic reflector, the parabolic reflector will transform the spherical wave into a collimated wave propagating away from the parabolic reflector. Thus, a parabolic reflector can be useful for redirecting sound waves 180 degrees within a small volume. In one example, a parabolic reflector can be located within the protective enclosure 100 between the speaker 405 and the first end 115 of the waveguide 110 so that the speaker is proximate the focus of the parabolic reflector. The parabolic reflector can collimate sound waves from the speaker 405 and direct them into the first end 115 of the waveguide 110. A parabolic reflector can be located within the protective enclosure 100 proximate the second end 120 of the waveguide 110 to assist in collimating the sound waves toward the user, thereby improving the directivity of the waveguide. This may allow the outer dimension of the protective enclosure 100 to be reduced, which is an attribute certain users may prefer.

In one example, a protective enclosure for an electronic device can include a waveguide having a first end and a second end. The first end of the waveguide can be proximate a speaker of an electronic device when the electronic device is installed in the protective enclosure. The waveguide can increase in cross-sectional area between the first end and the second end, and the second end of the waveguide can be located proximate a front surface of the protective enclosure. The waveguide can have a length of at least 9.8 cm. At least a portion of the waveguide can be an enclosed passage disposed between an inner surface of the protective enclosure and an outer back surface of the protective enclosure. The protective enclosure can include an upper portion and a lower portion that are connected to form at least a portion of the waveguide.

In another example, the waveguide can be a trough proximate an inner surface of the protective enclosure, and a back surface of the electronic device can provide a bounding surface of at least a portion of the waveguide when the electronic device is installed in the protective enclosure. The back surface of the electronic device can seal against a left rim and a right rim of the waveguide to seal at least a portion of the waveguide. The waveguide can include sealing material proximate the left and right rims of the waveguide.

In one example, the total expansion of the waveguide between the first end and the second end of the waveguide can be at least 3. The waveguide can increase in cross-sectional area from less than 1.0 cm$^2$ proximate the first end to more than 1.0 cm$^2$ proximate the second end. The waveguide can increase in cross-sectional area from less than 1.0 cm$^2$ proximate the first end to more than 1.5 cm$^2$ proximate the second end. The waveguide can have a length of at least 14.3 cm, at least 28.6 cm, at least 57 cm, or between 14.3 and 57 cm.

In one example, the first end of the waveguide can be configured to seal around a speaker opening of an electronic device when an electronic device is installed in the protective enclosure. The protective enclosure can include a seal circumscribing the first end, and the seal can be configured to be positioned between the first end of the waveguide and a speaker opening of the electronic device when the electronic device is installed in the protective enclosure.

The protective enclosure can include a first parabolic reflector proximate the first opening of the waveguide. The location of the first parabolic reflector can be configured to redirect sound waves from a speaker of an electronic device into the first end of the waveguide when an electronic device is installed in protective enclosure. The protective enclosure can include a second parabolic reflector proximate the second end of the waveguide. The second parabolic reflector can be configured to direct sound waves propagating through the waveguide in a direction normal to a front surface of the protective enclosure.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective enclosure for enhancing sound generated by a speaker of an electronic device, the protective enclosure comprising:
    a front, a back, and at least two sides, the back including a hard outer back surface for protecting the electronic device when the electronic device is installed in the protective enclosure and a soft inner back surface;
    a plurality of ribs formed in the soft inner back surface of the protective enclosure for increasing rigidity of the protective enclosure; and
    a waveguide formed in at least the soft inner back surface of the protective enclosure between the ribs, the waveguide including a first end and a second end, wherein the first end of the waveguide is proximate a speaker opening of the electronic device when the electronic device is installed in the protective enclosure, wherein the waveguide increases in cross-sectional area between the first end and the second end, and wherein the second end of the waveguide is located proximate at least one of the at least two sides of the protective enclosure.

2. The protective enclosure of claim 1, wherein at least a portion of the waveguide includes an enclosed passage disposed between the soft inner back surface of the protective enclosure and the hard outer back surface of the protective enclosure.

3. The protective enclosure of claim 1, wherein the waveguide includes a raised feature that extends from the waveguide beyond a plane of the soft inner back surface and along a rim of the wavequide such that the raised feature contacts a back surface of the electronic device and compresses to seal the back surface of the electronic device to the waveguide along a length of the waveguide when the electronic device is installed in the protective enclosure.

4. The protective enclosure of claim 3, wherein a second raised feature extends from the waveguide beyond a plane of the soft inner back surface and along a second rim of the waveguide such that the second raised feature also contacts the back surface of the electronic device and compresses to seal against the back surface of the electronic device when the electronic device is installed in the protective enclosure.

5. The protective enclosure of claim 3, wherein the raised feature comprises a same material as the soft inner back surface.

6. The protective enclosure of claim 1, wherein the waveguide has a total expansion factor between the first end and the second end of the waveguide of at least 3.

7. The protective enclosure of claim 1, wherein the waveguide increases in cross-sectional area from less than 1.0 $cm^2$ proximate the first end to more than 1.0 $cm^2$ proximate the second end.

8. The protective enclosure of claim 1, wherein the waveguide increases in cross-sectional area from less than 1.0 $cm^2$ proximate the first end to more than 1.5 $cm^2$ proximate the second end.

9. The protective enclosure of claim 1, wherein the waveguide has a length of at least 14.3 cm.

10. The protective enclosure of claim 1, wherein the waveguide has a length of at least 28.6 cm.

11. The protective enclosure of claim 1, wherein the second end of the waveguide is located proximate at least two of the sides of the protective enclosure.

12. The protective enclosure of claim 1, wherein the waveguide has a length greater than or equal to one wavelength of a selected frequency of the sound.

13. The protective enclosure of claim 1, wherein the first end of the waveguide seals around the speaker opening of the electronic device when the electronic device is installed in the protective enclosure.

14. The protective enclosure of claim 13, further comprising a seal circumscribing the first end of the waveguide, wherein the seal is configured to be positioned between the first end of the waveguide and the speaker opening of the electronic device when the electronic device is installed in the protective enclosure.

15. The protective enclosure of claim 1, wherein the soft inner back surface of the protective enclosure comprises silicone.

16. An enclosure for enhancing sound generated by an electronic device having a speaker and a speaker opening, the enclosure comprising:
    three or more sides; and
    a back portion attached to the three or more sides to form the enclosure for holding the electronic device, the back portion including an outer layer comprising a hard material for protecting the electronic device from external forces when the electronic device is installed in the enclosure, the back portion further including an inner layer comprising a soft material that includes a trough that forms a waveguide when the trough is bounded by a back of the installed electronic device, the inner layer further comprising a plurality of ribs for increasing rigidity of the enclosure, the trough formed in the inner layer between the ribs and including a first end proximate the speaker opening of the installed electronic device, the trough further including a second end having a cross-sectional area that is larger than a cross-sectional area of the first end of the trough, the second end of the trough proximate one of the three or more sides.

17. The enclosure of claim 16 wherein the inner layer and the outer layer extend from the back portion into one of the three or more sides of the enclosure that is proximate the speaker opening of the installed electronic device.

18. The enclosure of claim 17 wherein the one of the three or more sides proximate the speaker opening includes the first end of the trough and wherein the trough extends from the first end along the back portion to the one of the three or more sides proximate the second end of the trough.

19. The enclosure of claim 16 wherein the three or more sides includes four sides.

20. The enclosure of claim 16, the trough further including raised edges that extend up from the trough beyond a plane of the inner layer and along the trough such that the raised edges contact and are compressed by the back of the electronic device to seal against the back of the electronic device to form the wavequide when the electronic device is installed in the enclosure.

* * * * *